US012699792B2

(12) United States Patent
Vacca et al.

(10) Patent No.: US 12,699,792 B2
(45) Date of Patent: Aug. 4, 2026

(54) SYSTEMS AND METHODS FOR DATA ACCESS SECURITY

(71) Applicant: State Farm Mutual Automobile Insurance Company, Bloomington, IL (US)

(72) Inventors: Karey Vacca, Heyworth, IL (US); Scott D. Dies, Eureka, IL (US); Chad Skinner, Talladega, AL (US); Holley Rueda, Scottsdale, AZ (US); Shane Cisco, Johns Creek, GA (US); Brent Campbell, Cumming, GA (US); Kelvin Tarrance, Cumming, GA (US); Padmaja Karothi, Cumming, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 229 days.

(21) Appl. No.: 18/594,322

(22) Filed: Mar. 4, 2024

(65) Prior Publication Data

US 2025/0278503 A1 Sep. 4, 2025

(51) Int. Cl.
*G06F 21/62* (2013.01)
*G06F 21/60* (2013.01)

(52) U.S. Cl.
CPC ........ *G06F 21/6218* (2013.01); *G06F 21/606* (2013.01)

(58) Field of Classification Search
CPC ........................... G06F 21/6218; G06F 21/606
See application file for complete search history.

(56) References Cited

U.S. PATENT DOCUMENTS

| | | | | | |
|---|---|---|---|---|---|
| 11,120,003 | B2 * | 9/2021 | Wu | .................. | G06F 16/24549 |
| 11,222,142 | B2 * | 1/2022 | Jones | ...................... | G06F 21/60 |
| 11,501,016 | B1 * | 11/2022 | Peterson | ............. | G06F 21/6245 |
| 11,711,422 | B1 * | 7/2023 | Jain | ........................ | H04L 41/16 |
| | | | | | 709/203 |
| 11,934,682 | B1 * | 3/2024 | Bhatt | ................... | H04L 63/107 |
| 2007/0136237 | A1 * | 6/2007 | Barker | ................ | G06F 21/6227 |
| 2009/0089591 | A1 * | 4/2009 | Mattsson | ................ | G06F 21/31 |
| | | | | | 713/193 |
| 2012/0031921 | A1 * | 2/2012 | Cadiente | .............. | B65D 43/162 |
| | | | | | 220/788 |
| 2015/0254442 | A1 * | 9/2015 | Burgess | .................. | H04L 12/66 |
| | | | | | 726/27 |
| 2016/0364578 | A1 * | 12/2016 | Karn | ................... | G06F 21/6209 |
| 2019/0356654 | A1 * | 11/2019 | Tebben | ................. | G06F 16/245 |
| 2020/0045049 | A1 * | 2/2020 | Apostolopoulos | ....... | G06N 7/00 |
| 2021/0109929 | A1 * | 4/2021 | Sirohi | .............. | G06F 16/24535 |

(Continued)

*Primary Examiner* — Amir Mehrmanesh
*Assistant Examiner* — Aayush Aryal
(74) *Attorney, Agent, or Firm* — Lee & Hayes, P.C.

(57) ABSTRACT

Described herein are systems and techniques to facilitate efficient access to a data solution based on computing environment conditions. Rules may be generated for a data solution access that include conditional data and execution data. In response to a request for access to the data solution, the conditional data may be evaluated and corresponding execution data may be logged for conditional data that corresponds to the computing environment state. The logged execution data may be evaluated for redundancies and conflicts and the remaining execution data may be executed to facilitate access to the data solution.

20 Claims, 7 Drawing Sheets

(56)  References Cited

U.S. PATENT DOCUMENTS

| 2021/0232696 A1* | 7/2021 | Laurance | ............... G06F 16/21 |
| 2021/0303512 A1* | 9/2021 | Barday | ................ G06F 21/577 |
| 2022/0035949 A1* | 2/2022 | Blum | .................. G06F 21/6263 |
| 2022/0043671 A1* | 2/2022 | Vadapandeshwara | .... G06F 8/35 |
| 2022/0261497 A1* | 8/2022 | Barday | ................ G06F 21/604 |
| 2023/0205899 A1* | 6/2023 | Harres | ................ G06F 21/604 |
| | | | 726/28 |

* cited by examiner

200
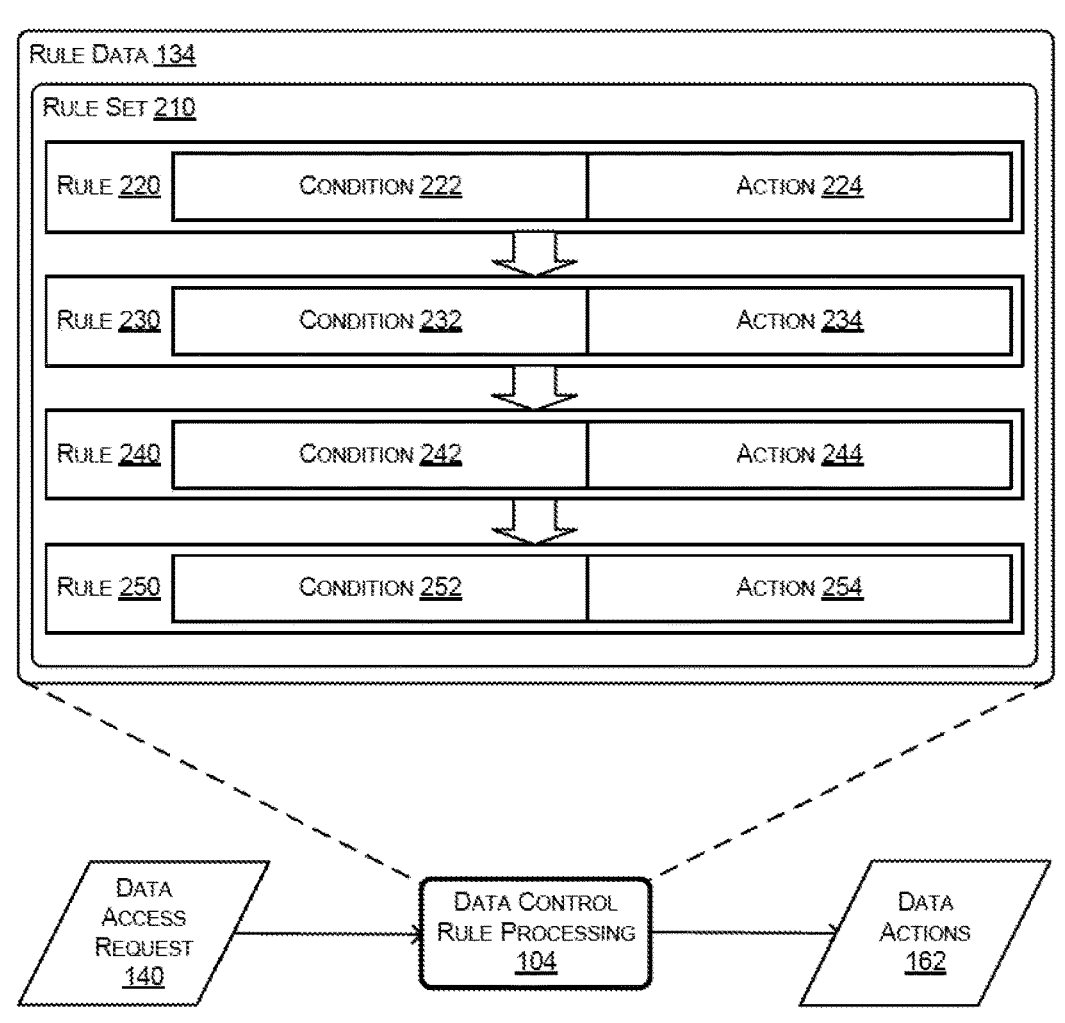
FIG. 2

300

AVAILABLE CONDITIONS

| CONDITION 310 |
| CONDITION 312 |
| CONDITION 314 |
| CONDITION 316 |
| ⋮ |
| CONDITION N |

AVAILABLE ACTIONS

| ACTION 320 |
| ACTION 322 |
| ACTION 324 |
| ACTION 326 |
| ⋮ |
| ACTION M |

| RULE 330 | CONDITION 314 | ACTION 322 |

RULE SET 340

| RULE 350 | CONDITION 310 | ACTION 326 |

| RULE 360 | CONDITION 310 | ACTION 324 |

| RULE 330 | CONDITION 314 | ACTION 322 |

| RULE 370 | CONDITION 316 | ACTION 320 |

FIG. 3

400

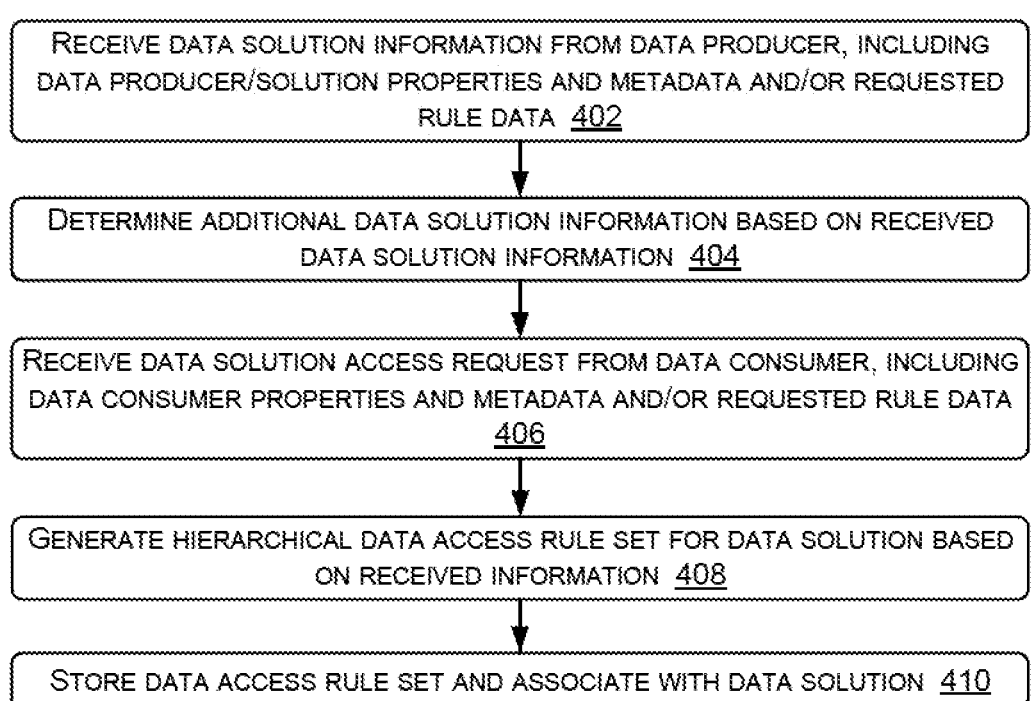

RECEIVE DATA SOLUTION INFORMATION FROM DATA PRODUCER, INCLUDING DATA PRODUCER/SOLUTION PROPERTIES AND METADATA AND/OR REQUESTED RULE DATA 402

DETERMINE ADDITIONAL DATA SOLUTION INFORMATION BASED ON RECEIVED DATA SOLUTION INFORMATION 404

RECEIVE DATA SOLUTION ACCESS REQUEST FROM DATA CONSUMER, INCLUDING DATA CONSUMER PROPERTIES AND METADATA AND/OR REQUESTED RULE DATA 406

GENERATE HIERARCHICAL DATA ACCESS RULE SET FOR DATA SOLUTION BASED ON RECEIVED INFORMATION 408

STORE DATA ACCESS RULE SET AND ASSOCIATE WITH DATA SOLUTION 410

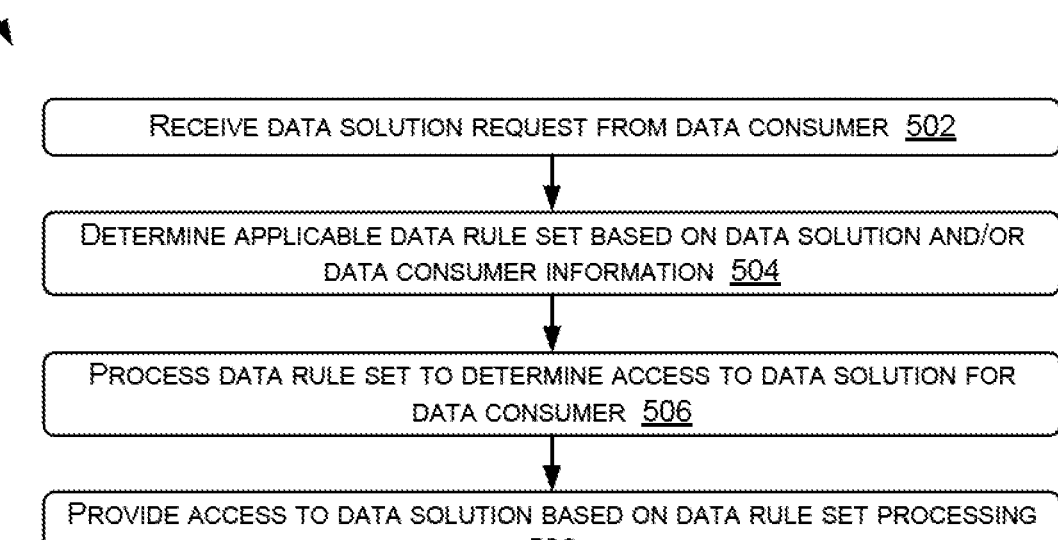

RECEIVE DATA SOLUTION REQUEST FROM DATA CONSUMER 502

DETERMINE APPLICABLE DATA RULE SET BASED ON DATA SOLUTION AND/OR DATA CONSUMER INFORMATION 504

PROCESS DATA RULE SET TO DETERMINE ACCESS TO DATA SOLUTION FOR DATA CONSUMER 506

PROVIDE ACCESS TO DATA SOLUTION BASED ON DATA RULE SET PROCESSING 508

FIG. 5

600

RETRIEVE RULE SET FOR REQUESTED DATA SOLUTION  602

EVALUATE CONDITION(S) OF FIRST RULE IN DATA SET  604

CONDITION(S) OF FIRST RULE SATISFIED? 606

No

YES

ADD ACTION(S) OF SATISFIED CONDITION(S) ACTION LOG  608

RULE(S) REMAINING? 610

No

YES

EVALUATE CONDITION(S) OF SUBSEQUENT RULE IN DATA SET  612

CONDITION(S) OF SUBSEQUENT RULE SATISFIED? 614

YES

No

REMOVE DUPLICATE ACTIONS AND/OR RESOLVE CONFLICTING ACTIONS 616

PROCESS ACTIONS IN ACTION LOG, LOG RESULTS AND UPDATE STATE(S)  618

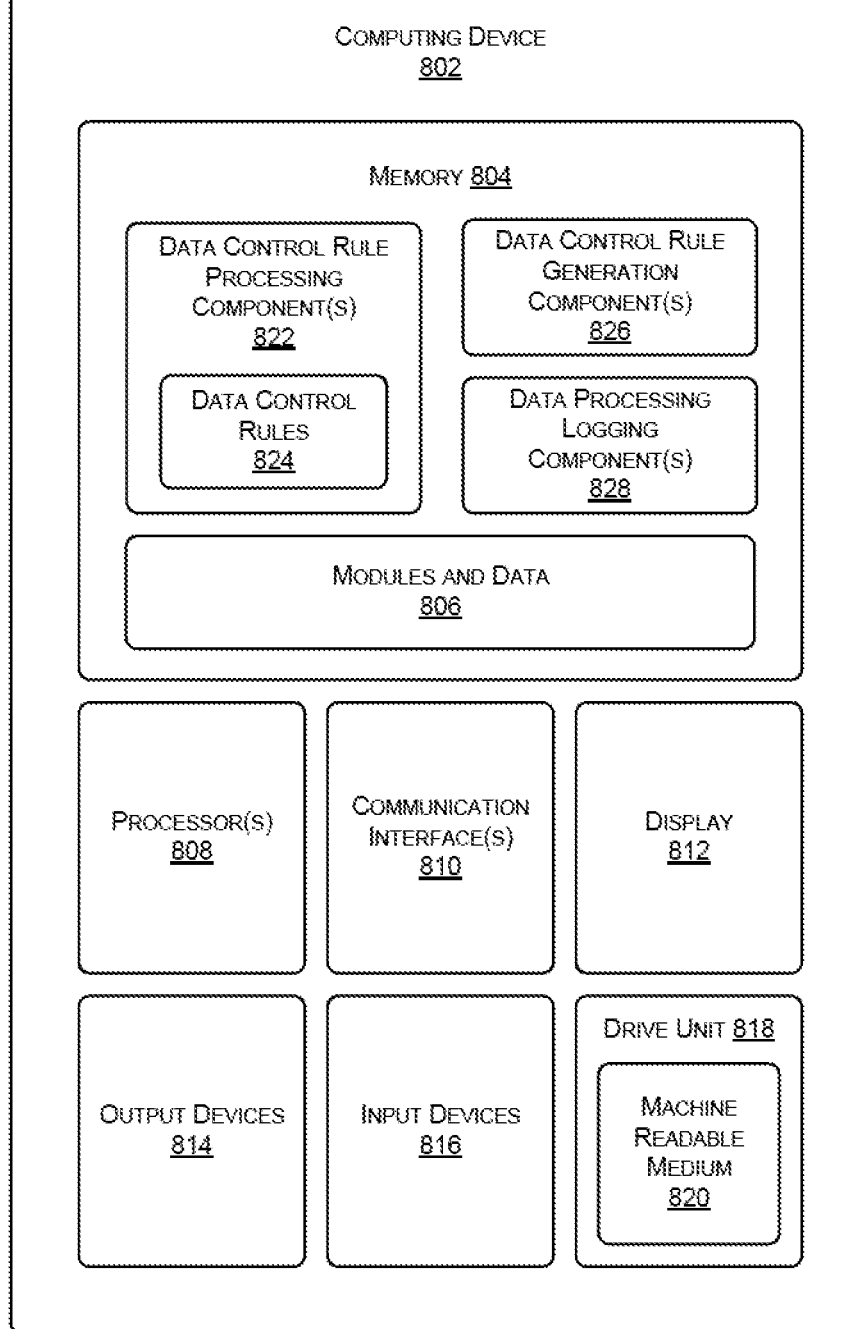
FIG. 8

SYSTEMS AND METHODS FOR DATA ACCESS SECURITY

TECHNICAL FIELD

The present disclosure generally relates to data security and more specifically to systems and methods for granularly providing data access and controlling and tracking data usage based on data access rules systemically negotiated by data producers and data consumers.

BACKGROUND

As technology has advanced and computer networks, computing devices, and other such systems have proliferated, the operations performed using these systems have expanded greatly. This has resulted in the generation of large amounts of data used to perform such operations. Some of this data includes personal information and other types of sensitive data that may be used inappropriately if mishandled. For example, personal data in the hands of unauthorized users may be used to commit fraud and/or access other data that may facilitate improper or illegal acts. Therefore, safeguards have been implemented to protect such sensitive data. For example, legal and regulatory requirements have been put in place that must be followed by entities that process such sensitive data. Such entities may also have contractual obligations to protect such data. Furthermore, entities handling sensitive information may take steps to protect such information in order to maintain goodwill with their (current and/or prospective) customers and/or users.

Due to the diversity of types of personal and/or sensitive data that may be collected by an entity, as well as the various types of processing that may be performed using such data, various types and levels of access to such data may be provided to potential consumers of the data. In large organizations performing many complex operations potentially involving such data, there may be many different variables involved in determining appropriate access. For example, the level and type of access provided to a data consumer may depend on the data user (data consumers), the processing to be performed on such data, where such data may be stored, a duration of data storage, where and/or to whom may the results of data processing be provided, etc. Because of this complexity of access determinations for personal and/or sensitive data, it may be challenging to maintain data security while efficiently providing data consumers with the level and type of data access needed to perform operations. The example systems and methods described herein may be directed toward mitigating or overcoming one or more of the deficiencies described above.

SUMMARY

The systems and methods described herein can facilitate the efficient determination of appropriate data access and configuration of a computing environment to facilitate such access. In examples, the techniques described herein may relate to a method comprising receiving, by a processor executing in a computing environment, data solution intercommunication data associated with access to data via a data solution; determining, by the processor, an ordered set of data access data structures associated with the data solution, individual structures of the ordered set of data access data structures comprising condition data and corresponding computer execution data; determining, by the processor, based at least in part on the data solution intercommunication data, that a state of the computing environment corresponds to first condition data of a first structure of the ordered set of data access data structures; determining, by the processor, based at least in part on the data solution intercommunication data, that the state of the computing environment corresponds to second condition data of a second structure of the ordered set of data access data structures; storing, by the processor in a data file, based at least in part on determining that the state of the computing environment corresponds to first condition data and the second condition data: first computer execution data corresponding to the first condition data, and second computer execution data corresponding to the second condition data; modifying, by the processor, based at least in part on the state of the computing environment, the data file by removing the second computer execution data from the data file; and executing, by the processor, based at least in part on the first computer execution data in the data file, one or more computing processes.

In examples, the state of the computing environment indicates that one of: the first computer execution data is redundant to the second computer execution data, or the first computer execution data is contradictory to the second computer execution data. The first computer execution data may include data, that when executed by a second processor, cause the second processor to perform one or more of: establish a secure communications session with the data solution; initiate monitoring of a communications session; or generating a notification to the data solution. The method may also include receiving, by the processor, a request to modify the ordered set of data access data structures, the second request comprising a modified first structure of the ordered set of data access data structures; determining an updated first structure of the ordered set of data access data structures based at least in part on the request; and associating, by the processor, the updated first structure of the ordered set of data access data structures with the ordered set of data access data structures. Associating the updated first structure of the ordered set of data access data structures with the ordered set of data access data structures may include: transmitting a request for approval of the updated first structure of the ordered set of data access data structures to the data solution; and replacing the first structure of the ordered set of data access data structures with the updated first structure of the ordered set of data access data structures based at least in part on a response to the request received from the data solution. The modified first structure of the ordered set of data access data structures may include one or more of modified first condition data or modified first computer execution data. The method may also include generating the ordered set of data access data structures and associating the ordered set of data access data structures with the data solution and at least one additional data solution. Techniques may also include generating the ordered set of data access data structures based at least in part on the data solution and at least one data consumer. The first structure of the ordered set of data access data structures comprises third computer execution data.

In examples, a non-transitory computer-readable medium comprising instructions that, when executed by one or more processors executing on a data control system configured in a computing environment, may cause the one or more processors to perform operations comprising: receiving data solution intercommunication data associated with access to data via a data solution; determining an ordered set of data access data structures associated with the data solution, individual structures of the ordered set of data access data structures comprising condition data and corresponding computer execution data; determining, based at least in part on the data solution intercommunication data, that a state of the computing environment corresponds to first condition data of a first structure of the ordered set of data access data structures; determining, based at least in part on the data solution intercommunication data, that the state of the computing environment corresponds to second condition data of a second structure of the ordered set of data access data structures; storing, in a data file, based at least in part on determining that the state of the computing environment corresponds to first condition data and the second condition data: first computer execution data corresponding to the first condition data, and second computer execution data corresponding to the second condition data; modifying, based at least in part on the state of the computing environment, the data file by removing the second computer execution data from the data file; and executing, based at least in part on the first computer execution data in the data file, one or more computing processes.

In various examples, the first structure of the ordered set of data access data structures may include third computer execution data. The state of the computing environment may indicate that one of: the first computer execution data is redundant to the second computer execution data, or the first computer execution data is contradictory to the second computer execution data. The first computer execution data may include data, that when executed by a second processor, may cause the second processor to perform one or more of: establish a secure communications session with the data solution; initiate monitoring of a communications session; or generating a notification to the data solution. The operations may also include generating the ordered set of data access data structures based at least in part on the data solution and at least one data consumer. The operations may further include: generating the ordered set of data access data structures; and associating the ordered set of data access data structures with the data solution and at least one additional data solution.

In examples, a system according to the disclosed examples may include: one or more processors; and a non-transitory memory storing computer-executable instructions that, when executed, cause the one or more processors to perform operations comprising: receiving data solution intercommunication data associated with access to data via a data solution; determining an ordered set of data access data structures associated with the data solution, individual structures of the ordered set of data access data structures comprising condition data and corresponding computer execution data; determining, based at least in part on the data solution intercommunication data, that a state of the computing environment corresponds to first condition data of a first structure of the ordered set of data access data structures; determining, based at least in part on the data solution intercommunication data, that the state of the computing environment corresponds to second condition data of a second structure of the ordered set of data access data structures; storing, in a data file, based at least in part on determining that the state of the computing environment corresponds to first condition data and the second condition data: first computer execution data corresponding to the first condition data, and second computer execution data corresponding to the second condition data; modifying, based at least in part on the state of the computing environment, the data file by removing the second computer execution data from the data file; and executing, based at least in part on the first computer execution data in the data file, one or more computing processes.

The first structure of the ordered set of data access data structures may include third computer execution data. The system may also perform operations that include: receiving, by the processor, a request to modify the ordered set of data access data structures, the second request comprising a modified first structure of the ordered set of data access data structures; determining an updated first structure of the ordered set of data access data structures based at least in part on the request; and associating, by the processor, the updated first structure of the ordered set of data access data structures with the ordered set of data access data structures. The modified first structure of the ordered set of data access data structures comprises one or more of: modified first condition data or modified first computer execution data.

In examples, a system may include means for receiving data solution intercommunication data associated with access to data via a data solution; means for determining an ordered set of data access data structures associated with the data solution, individual structures of the ordered set of data access data structures comprising condition data and corresponding computer execution data; means for determining, based at least in part on the data solution intercommunication data, that a state of the computing environment corresponds to first condition data of a first structure of the ordered set of data access data structures; means for determining, based at least in part on the data solution intercommunication data, that the state of the computing environment corresponds to second condition data of a second structure of the ordered set of data access data structures; means for storing, in a data file, based at least in part on determining that the state of the computing environment corresponds to first condition data and the second condition data: first computer execution data corresponding to the first condition data, and second computer execution data corresponding to the second condition data; means for modifying, based at least in part on the state of the computing environment, the data file by removing the second computer execution data from the data file; and means for executing, based at least in part on the first computer execution data in the data file, one or more computing processes.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), component(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

FIG. 2 shows an example of a data structure and components that may process such a data structure as part of a data control system, in accordance with examples of the disclosure.

FIG. 3 shows example data structures that may be processed in a data control system, in accordance with examples of the disclosure.

FIG. 4 is a flow diagram illustrating an example process for generating a data access rule set in a data control system, in accordance with examples of the disclosure.

FIG. 5 is a flow diagram illustrating an example process for processing a data access rule set in a data control system, in accordance with examples of the disclosure.

FIG. 6 is a flow diagram illustrating an example process for hierarchically processing rules within a data access rule set in a data control system, in accordance with examples of the disclosure.

FIG. 8 shows an example system architecture for a computing device associated with a data access control system.

Figure 1:
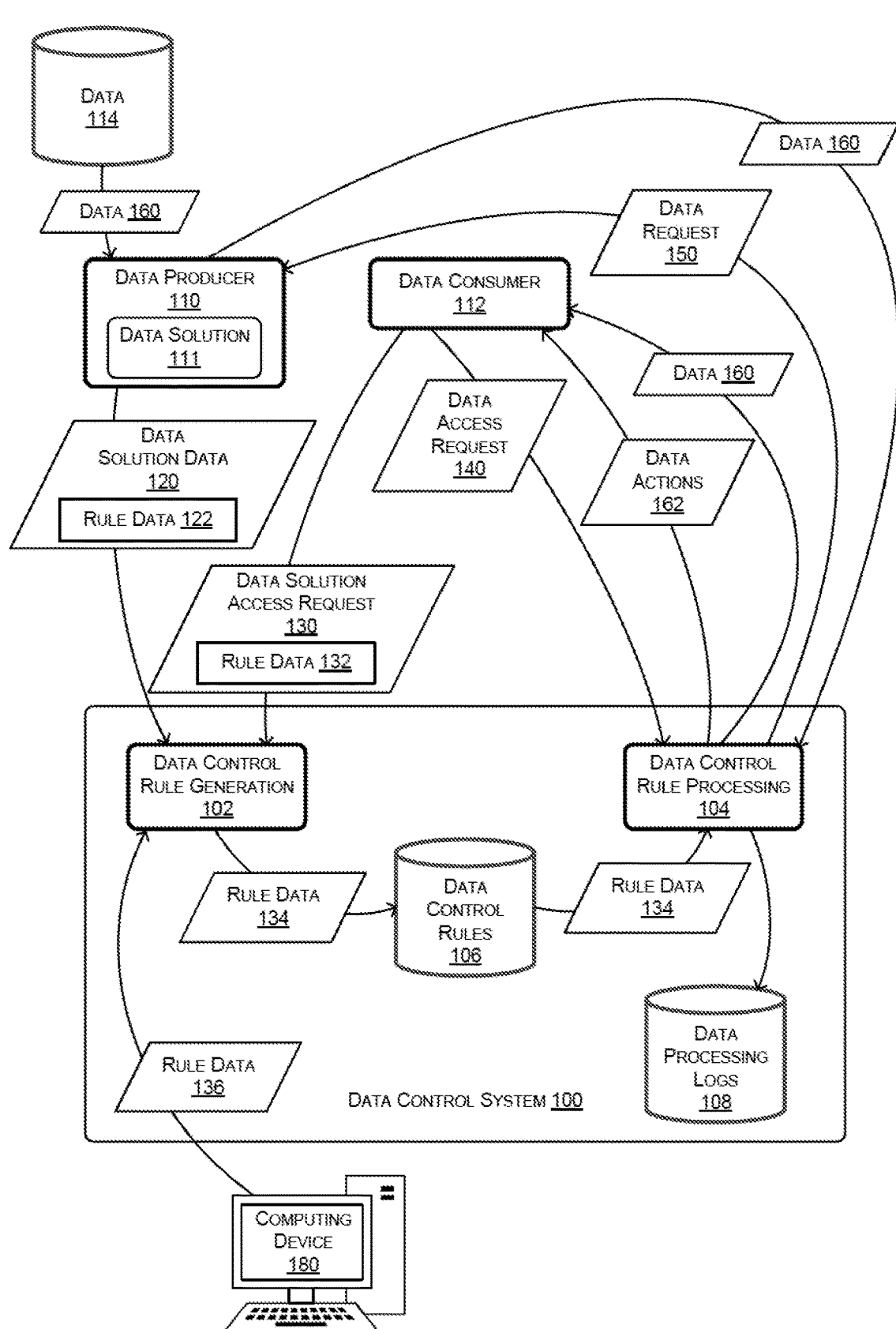
FIG. 1 is a block diagram depicting an example data control system and associated components for determining and tracking data access, in accordance with examples of the disclosure.

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

A large organization or entity, such as an insurance company, a bank, a major online retailer, etc., may collect and process large amounts of user-related data. Such data may be collected directly from users (e.g., name, address, credit card numbers, birthdate, etc.) and/or may be retrieved or determined and associated with users (e.g., credit score, driving history, insurance claim history, etc.). Much of such data may be considered confidential or personal information that should and may be required to be protected. Such data may be generally referred to herein as "sensitive data."

Such entities may configure, operate, and maintain various systems to collect, store, and/or process data, including sensitive data. Such systems may generally be categorized as data producers or data consumers. Data producers may (e.g., initially) collect or determine data, while data consumers may request, retrieve, and/or access such data and perform processing operations using such data to accomplish particular tasks. Both such systems may be implemented using one or more of a variety of computing devices and/or systems that may interoperate (e.g., via one or more computer networks) with other devices and/or systems. Such systems may be physically configured and maintained by an entity, cloud-based, and/or a combination thereof. Data producers may obtain and/or determine sensitive data, which may then be obtained and processed by one or more data consumers for processing.

In examples, the providing of particular types of data that may be obtained and/or determined by a data producer to a data consumer for processing may be referred to as a "data solution." Examples of a data solution may include "insurance policy premium data," "insurance claim data," "customer contact information," etc. A data control system may be configured to interact with data consumers and data producers and to ensure that appropriate access to and use of data (e.g., associated with a data solution) is maintained.

In examples, a data control system may initially register a data solution by acquiring and storing data solution information, such as a physical location of the data solution (e.g., data producer device(s) and system(s)), ownership of the data solution (e.g., organization, entity, etc.), data provided by the data solution (e.g., data type, data sensitivity, etc.), metadata associated with the data solution, and/or any other parameters or registration data that may be used to identify and/or otherwise may be associated with a data solution. The data control system may receive data solution information from the data solution as part of the registration process. The data control system may also, or instead, determine data solution information by, for example, using information received from the data solution to determine other data solution information.

Included in the data solution information may be one or more data access rules that the data solution intends to be associated with the data it provides. An individual such rule may include one or more conditions and one or more corresponding actions. In examples, if the condition(s) associated with an action are satisfied, the action is then performed. These rules may be grouped into a rule set associated with the data solution. As described in more detail herein, the rules within a rule set may be evaluated in a particular (e.g., hierarchical) order. The rules and rule set may be configured by a user and/or automatically based on one or more data solution parameters and/or characteristics. The rules and rule set may be generalized and applicable to multiple data solutions.

A data consumer may wish to interact with a data solution to acquire data for processing operations. Such a data consumer may indicate its request to interact with a data solution to the data control system. This request may include the data consumer's set of one or more rules that it wishes to apply to the data provided by the data solution. In examples, the data control system may attempt to reconcile the rules requested by the data solution with the rules requested by the data consumer. In some examples, the data control system may facilitate a negotiation between these two systems to determine a final applicable rule set for interactions between the particular data solutions and data consumer. Alternatively or additionally, the data control system may determine any redundant, inapplicable, and/or repetitive rules between the rules requested by the data solution with the rules requested by the data consumer and remove and/or amend such rules as needed to generate a final rule set applicable to interactions between the particular data solutions and data consumer.

Because the rules and rule sets that are applied to interactions between a particular data solution and a particular data consumer may be based on generalized rules and rule sets, when such rules and/or rule sets are modified, the modifications may be automatically propagated by the data control system to the rules and rule sets that are applied to interactions between the particular data solution and the particular data consumer. For example, if an administrative user updates a condition and/or an action associated with a particular rule, the data control system may automatically propagate that update to the rule in any rule set that has been applied or otherwise assigned to interactions between a particular data solution and a particular data consumer.

A rule set may be associated with or otherwise applied to a particular data solution and/or a combination of a particular data solution and a particular data consumer. For example, a rule set may be determined for a data solution that is then applied to any (e.g., all) data provided in response to a request for data from the data solution received from any data consumer. Alternatively or additionally, a rule set may be determined for a combination of a data solution and a data consumer that is then applied to any (e.g., all) data provided in response to requests for data from the data solution received from specifically the data consumer associated with the rule set. Such a rule set may or may not be applied to any other combinations of data solutions and data consumers.

Based on a determined rule set for a particular data solution and/or data solution/data consumer combination, the data control system may then process the associated rule sets based on an order or priority (e.g., hierarchy) indicated in the rule set. For example, the data control system may receive or detect a data consumer request for data from a data solution. The data control system may then determine a destination or desired state for the request. For example, the desired state may be associated with the transmission of a particular set of data from the data solution to the data consumer (e.g., insurance claim data for a particular claim has been transmitted to an insurance claim processing system).

Based on this state, the data control system may evaluate the rule set in order. For example, the data control system may evaluate each condition of the first rule to determine if it is satisfied. For example, the data control system may evaluate each condition of the first rule by determining if the state of the computing environment in which the data control system is configured corresponds to the condition data of the first rule. If so, the data control system may add the action(s) (e.g., computer execution data corresponding to the condition data) of the first rule to an action log, list, or other form of data file. If the condition(s) of the first rule are not met, then the corresponding action(s) may not be added to the action log. Once all the rules for which corresponding conditions have been satisfied are added to the action log, the data control system may then evaluate the actions in the action log for conflicting, redundant, and/or duplicate actions. For example, the data control system may evaluate the computing environment in which it is configured to determine whether any actions in the action log are redundant, duplicative, or in conflict. Duplicated and/or redundant actions may be removed while conflicting actions may be resolved by removing the lower priority action from the action log (e.g., the action associated with a relatively lower priority rule in the rule set).

The data control system may then iterate through the actions in the action log in order (e.g., based on the order of their associated rules in the rule set). The actions may be used to implement changes to the data solution, the data consumer, and/or the environment in which they are operating that progress the overall current operational environment state to the desired state. Thus, if an action does not progress the current state towards the desired state, the action may not need to be performed and may be skipped, thereby reducing unnecessary resource utilization. The data control system may evaluate each action as it iterates through the action log to determine if the action will advance the current state toward the desired state. For example, an action may be granting a data consumer access to an intermediate storage system that will store the data provided by the data solution. If the data consumer already has access to such a storage system, the data control system need not instruct the storage system to allow access by the data consumer. In another example, an action may be initiating logging of communications exchanged between the data consumer and the data solution. If such logging is already occurring, the data control system need not instruct a logging system to log the communications exchanged between the data consumer and the data solution.

Data associated with the evaluation of a rule set may be tracked, for example, for future reference (e.g., security audits, system improvements, system performance evaluation, debugging, etc.). For example, the data control system may log operations such as each condition evaluated, whether the condition evaluation indicated that a corresponding action should be taken, each action initiated, and the results of the action. The data control system may also, or instead, log state information associated with each operation performed. Such data may be stored and associated with a particular data solution/data consumer interaction. Such data may also be stored more generally. For example, state data may be stored as general environmental state data and/or state data associated with one of the data solution or the data consumer. For instance, an indication of the current monitoring of communications in which the data solution is engaged may be stored as state data associated with the data solution.

By designating the rule analysis and action execution to a data control system as described herein, the security of data in the environment may be improved which also improves the efficiency of operation of other components in the system. For example, in the disclosed examples, a data producer or data solution does not need to maintain sets of rules for various data consumers and types of data requests, freeing the resources of the data producer or data solution to be applied to data acquisition, determination, and production (i.e., instead of rules evaluation and action execution). This decentralization of the rules-based data access system also relieves a data consumer from having to maintain rule sets and perform rules analysis and related actions. Moreover, the data control system as described herein may perform the function of logging the results of rules analysis, action executions, and state changes, further relieving data solutions, data producers, and/or data consumers from devoting resources to such operations.

FIG. 1 illustrates a data control system 100 that may be implemented according to examples of the instant disclosure. The data control system 100 may be configured to detect requests for access to any type of data and responsively evaluate any one or more rules associated with such requests. The data control system may further be configured to generate rules and rule sets based on data producer information, data consumer information, data solution information, and/or user input. For example, the system 100 may be configured to generate a rule set based on information received that represents parameters and/or characteristics associated with a data solution and/or a data solution/data consumer combination. The data control system 100 may further be configured to apply such a rule set to a request for data that is determined to be associated with that data solution and/or data solution/data consumer combination.

The system 100 may include a data control rule generation component 102 that may be configured to generate rules and rule sets and associate such rules and rule sets with particular data solutions and/or data solution/data consumer combinations. For example, a data producer 110 may offer a data solution 111 to other systems and/or entities with which it may interact, such as a data consumer 112. The data producer 110 may request registration of the data solution 111 with the data control system 100 by transmitting data solution data 120 to a data control rule generation component 102 configured at the data control system 100. The data solution data 120 may include, along with a request to register a particular data solution and data associated with the data solution (e.g., identifying data, parameters, data type(s), requirements, etc.), rule data 122 that may represent rules, actions, conditions, access policies, etc. that the data producer 110 may request be associated with the data solution that it provides. In some examples, the data solution data 120 may also indicate one or more particular data consumers to which the data producer 110 intends to apply the rules associated with the data solution 111. Alternatively, the data solution data 120 may request registration for the data solution 111 generally, with the associated rules applied to any data consumer requesting access to the data solution 111.

The data control rule generation component 102 may be configured to generate rules and a rule set based on the data solution data 120, including associated conditions and actions. In response to the data solution data 120, the data control rule generation component 102 may acquire and store data solution information, such as physical location of the data solution 111 (e.g., of the data producer 110), ownership of the data solution 111 (e.g., organization, entity, etc.), data provided by the data solution 111 (e.g., data type, data sensitivity, etc.), metadata associated with the data solution 111, and/or any other parameters or registration data that may be used to identify and/or otherwise may be associated with the data solution 111. The data control rule generation component 102 may receive this data solution information from the data solution 111 (e.g., from the data producer 110) as part of the registration process (e.g., from the data solution data 120). The data control rule generation component 102 may also, or instead, determine data solution 111 information by, for example, using information received from or about the data solution 111 to determine other data solution 111 information.

The data control rule generation component 102 may generate the rules and rule set to be applied to the data solution 111 (or the data solution/data consumer combination, if applicable). The rule generation operation may be based on proposed rules, actions, conditions, and/or other rule data provided by the data producer 110 (e.g., represented in the rule data 122). Alternatively or additionally, the generated rules and rule set may be based on (e.g., determined using) one or more parameters and/or characteristics associated with the applicable data solution and/or data solution/data consumer combination. For example, if the data solution data 120 indicates that the associated data solution 111 provides a particular type of data (e.g., sensitive data), the data control rule generation component 102 may responsively include, in the associated rule set, a rule that requires a secure communication connection or session between the data producer 110 and any data consumer requesting data via this particular data solution. In other examples, one or more rules may be generally applied to any data solution, data solutions of particular types, particular combinations of data solutions and data consumers, etc.

In examples, a user may also, or instead, provide rules, rule sets, actions, conditions, and/or other rule data for data solutions to the data control system 100, and in particular examples, to the data control rule generation component 102. For example, a user may operate the computing device 180 to provide rule data 136 to the data control rule generation component 102. The data control rule generation component 102 may then associate such rule data with a particular data solution, such as the data solution 111 indicated by the data solution data 120.

In examples, a data consumer may also, or instead, request rules, rule sets, actions, conditions, and/or other rule data for data solutions. For example, the data consumer 112 may transmit to the data control system 100, and in particular examples to the data control rule generation component 102, a data solution access request 130 that may be a request by the data consumer 112 for access to a data solution, such as the data solution 111 indicated by the data solution data 120. The data solution access request 130 may include proposed or requested rule data 132 representing proposed rules for the data consumer 112's interaction and use of data associated with the data solution 111. The data solution access request may be any form of data that may represent, at least, a request for interaction or communications with a data solution, such as data solution intercommunication data.

The data control rule generation component 102 may generate a rule set for the data solution 111 based on the received rule data 122, 132, and/or 136, as well as other data that the data control rule generation component 102 may determine and/or generate. In examples, if there are conflicting rules requested (e.g., one or more rules in rule data 122 conflict with a rule in rule data 132 and/or 136, and so forth), the data control rule generation component 102 may determine a priority of rule requestor to resolve the conflict and apply the rule proposed by the highest priority requestor. For example, an administrative user may have the highest priority, so any rule in rule data 136 may be selected over a conflicting rule in rule data 122 and/or rule data 132. The data solution 111 and/or data producer 110 may have the next highest priority, and therefore, any rule in rule data 122 may be selected over a rule in rule data 132, but not over a rule in rule data 136, and so forth. Any type of rule priority and/or selection scheme may be used and all such techniques are contemplated as within the scope of the disclosure.

The data control rule generation component 102 may also, or instead, perform one or more negotiation operations to resolve rule conflicts and ultimately generate an applicable rule set for the data solution 111. For example, the data control rule generation component 102 may provide one or more rules proposed by the data consumer 112 to the data producer 110, which may respond with an acceptance or denial of such proposed rules, and vice versa.

Once a rule set is determined for a data solution, the data control rule generation component 102 may store the rule set and associated data at a data store, such as a data control rules data store 106. For example, the data control rule generation component 102 may provide rule data 134 representing the rule set applicable to the data solution 111 to the data control rules data store 106.

The data consumer 112 may subsequently interact with the data control system 100 to access the data solution 111 and acquire data for processing operations. For example, the data consumer 112 may transmit a data access request 140 to a data control rule processing component 104. The request 140 may indicate that the data consumer 112 wishes to access (e.g., at least a subset of) data 114 provided by the data solution 111. Using the request 140, the data control rule processing component 104 may determine and retrieve the applicable rule data 134 from the data control rules data store 106. For example, rule data may be indexed by particular data solutions, data types, data solution/data consumer combinations, and/or any other identifiers that the data control rule processing component 104 may use to retrieve the rule data 134.

The data control rule processing component 104 may then execute processing of the rules as described in more detail herein and may also log the results of rules processing operations (e.g., condition evaluations and/or action executions) at a data processing logs data store 108. For example, the data control rule processing component 104 may transmit data actions 162 to the data consumer 112 that may instruct the data consumer 112 to take one or more actions in order to progress the environment state. The data control rule processing component 104 may also, or instead, transmit instructions to, or otherwise cause, any one or more other components (e.g., data solution 111, data producer 110, etc.) to take actions based on the rules evaluation of rule data 134.

If, based on the processing of the rules, execution of the associated actions, and/or the environment state, the data control rule processing component 104 determines that the state is such that the data consumer 112 may now access the requested data via the data solution 111, the data control rule processing component 104 may instruct the data consumer 112 and/or the data solution 111 to proceed with the data access. The data consumer 112 and the data producer 110 may then interact to exchange the requested data. The data control rule processing component 104 may not be involved in such interactions, or the data control rule processing component 104 may log the interactions. For example, one or both of the data consumer 112 and the data producer 110 may be configured to provide interaction data to the data control rule processing component 104, which may store such interaction data at the data processing logs data store 108.

Alternatively or additionally, the data control rule processing component 104 may obtain the data based on the state by transmitting a data request 150 to the data producer 110 (e.g., the data solution 111) requesting data. The data producer 110 (e.g., the data solution 111) may retrieve data 160 in response and may transmit the data 160 to the data control rule processing component 104. The data control rule processing component 104 may then transmit the data 160 to the data consumer 112. Here again, the data control rule processing component 104 may store related data access data at the data processing logs data store 108.

As will be appreciated, there may be situations where the state of the environment is not progressed to a state that allows the requested data access. In such examples, the data control rule processing component 104 may take actions that can include denying the request (e.g., the data access request 140), informing the data consumer 112 of such a denial, and/or logging request denial data at the data processing logs data store 108.

FIG. 2 shows a non-limiting example 200 of rule data 134 represented in a data structure along with related data and processing components. The rule data 134 may represent a rule set and sub-structures of rule data that may include data representing rules, conditions, action, a rule processing order, and/or associated data. The rule data 134 may be determined by the data control rule processing component 104 based on the data access request 140.

The rule data 134 may include a rule set 210, which may include one or more rules, such as rules 220, 230, 240, and 250. The rule set 210, and any rule set described herein, may be an ordered set of data access data structures, where, for example, individual data access data structures represent rules that may individually include one or more conditions and/or actions (e.g., condition data and corresponding computer execution data).

The rules of the rule set 210 may have an associated order, precedence, or priority, as indicated by the arrows in this figure. For example, rule 220 is evaluated first, then rule 230, then rule 240, and finally rule 150. This order may be based on the granularity of the rule and/or the importance of the rule. For example, a very specific rule indicating that a particular state must be established may have a higher priority than a more general rule. Alternatively or additionally, a rule associated with data security may take precedence over a rule regarding general communicative connectivity between a data producer and a data consumer.

In this example, rule 220 may be initially evaluated by the data control rule processing component 104 by determining if the condition 222 is currently satisfied. If the condition is satisfied, the action 224 may be added by the data control rule processing component 104 to an action log of actions to be performed upon completion of the evaluation of all the rules in the rule set 210. If the condition is not satisfied, then the action may not be added. For example, the condition may be that a secure communications connection or session is not active between the data consumer 112 and the data solution 111 (e.g., the data producer 110). The action may be to establish a secure communications connection or session between these components. In this example, if a secure communications connection is active between the data consumer 112 and the data solution 111 (e.g., the data producer 110), the action of initiating such a connection or session is not added to the action log. Otherwise, the action of establishing a secure communications connection between the data consumer 112 and the data solution 111 (e.g., the data producer 110) may be added to the action log.

The data control rule processing component 104 may then evaluate rule 230, including the condition 232, and add action 234 to the action log if needed. The data control rule processing component 104 may then similarly evaluate the remaining rules 240 and 250, in that order, adding their respective actions to the action log if needed based on the associated conditions. The results of any such evaluations may be stored in a logging data store, such as the data processing logs data store 108.

Upon completion of evaluation of (e.g., all) the rules of the rule set 210, the data control rule processing component 104 may remove duplicated actions from the action log and/or resolve conflicting actions based on action and/or rule priority or precedence. The data control rule processing component 104 may then initiate the execution of the actions in the action log. As described in more detail herein, the data control rule processing component 104 may determine a desired state based on the data access request 140 and then evaluate each action in the action to determine if the action progresses environmental state towards this desired state. If so, the data control rule processing component 104 may execute the action. As shown here, execution of actions may include instructing other components to take one or more actions, such as transmitting data action 162 to the data consumer 112. The execution and results of any such actions may be stored in a logging data store, such as the data processing logs data store 108.

FIG. 3 shows non-limiting examples of data structures and data sub-structures that may be used to represent various portions of a rule and/or a rule set. In examples, a component, such as the data control rule generation component 102, may be configured with a variety of available conditions and actions. The data control rule generation component 102 may determine, based on data solution data and/or other data, one or more conditions that may be required for the data solution (and/or the data solution/data consumer combination). For example, the data control rule generation component 102 may generate a rule 330 by selecting a condition 314 from among the available conditions 310, 312, 314, 316 . . . N and associating that condition with the rule 330.

In examples, the available conditions may each be any type of condition or condition data. The available actions may each be any type of action or action data, including computer execution data that may be executed on a computing device or system.

The data control rule generation component 102 may then determine an action corresponding to the condition 314, such as action 322, from among the available actions 320, 322, 324, 326 . . . M and associating that action with the rule 330. Actions and conditions may be associated with one another already (e.g., preconfigured as such) and/or may be determined based on data available to the data control rule generation component 102 during the generation of a rule set. The available conditions and actions may be generally available for (e.g., all) rule set generation or may be available (e.g., only) for particular types of rule set generation (e.g., for particular types of data solutions or data solution/ data consumer combinations).

The generated rules, such as rule 330, may then be included in a rule set, such as rule set 340. The data control rule generation component 102 may determine a rule precedence or priority and may order the rules in the rule set based on this. The rules may be generated distinctly from the order of the rules in a rule set. For example, the data control rule generation component 102 may generate the rule 220 after it has generated rules 350, 260, and 370, but may then determine that the rule 330 should fall between rule 360 and rule 370. Thus, the data control rule generation component 102 may insert the rule 330 at that position within the rule hierarchy of the rule set 340.

FIG. 4 illustrates an exemplary process 400 for generating a rule set that may be implemented at data control system such as those described herein. At 402, a data control rule generation component (e.g., data control rule generation component 102) may receive data solution information from a data producer. This information may be received via a request for rule set generation from a data producer for a data solution. This information may include data associated with the data solution and/or associated data producer, including information about one or more components that are part of or interact with the data solution and/or associated data producer; types of data accessible via the data solution; data solution, data producer, and/or associated component ownership data, location data, and/or other associated data; and/or any other data that may be used by data control rule generation component to generate rules and rule set for a data solution.

At 404, the data control rule generation component may determine and/or generate other data solution information that may be used to generate rules and rule sets for a data solution. For example, the data control rule generation component may retrieve data (e.g., from another internal system and/or a third-party system) using data received from the data solution and/or associated data producer. The data control rule generation component may also, or instead, receive user input indicating data that may be used to generate rules and/or a rule set. For example, a user may be notified that a data solution has requested a rule set generation and may responsively provide data (e.g., via a user interface executed on a computing device) that may be used to determine rules and a rule set for the data solution.

At 406, the data control rule generation component may receive a data solution access request from a data consumer that may request permission to access data via a data solution. For example, a data consumer may transmit an initial request for access to a data solution that may include data associated with the data consumer and the desired data solution. This data may include ownership data, identifying data, and/or metadata associated with the data consumer, as well as or instead of the type of data to be accessed, the purpose or intended processing of the data, etc. In some examples, this request may be a preliminary request performed before any actual request for data via the data solution to enable future requests for such data. Alternatively, the request received at 406 may be an initial request for data access via the data solution and, may be processed as a request for data access as described herein after the associated rule set generation has been performed.

At 408, the data control rule generation component may generate the rules and the rule set, including the rule hierarchy, based on the data received and/or determined at 402, 404, and 406. At 410, the rule set may be stored in a rule data data store and associated with the data solution (and/or the data solution/data consumer combination).

FIG. 5 illustrates an exemplary process 500 for evaluating a rule set that may be implemented at data control system such as those described herein. At 502, a data solution request may be received from a data consumer at a data control rule processing component (e.g., data control rule processing component 104). This request may identify the data solution and/or the data consumer as well as the particular type of data being requested, the type of processing to be performed using the requested data, the storage means and duration for the requested data, etc.

At 504, the data control rule processing component may determine an applicable rule set based on the request. For example, the data control rule processing component may query a rule data data store for rule sets associated with the indicated data solution or data solution/data consumer combination. More refined queries may also, or instead, be used. For example, the data control rule processing component may query for a rule set based on a combination of a type of data to be accessed, a processing to be performed using the requested data, a storage means and duration for the requested data, etc.

At 506, the data control rule processing component may process the determined rule set to determine access for the data consumer to the data solution or otherwise resolve the request. For example, the data control rule processing component may evaluate conditions and perform actions as described in more detail herein to progress the environment to a desired state (based on the request for data access via the data solution) or to determine that the desired state is not achievable.

At 508, the data control rule processing component may provide access to data, or facilitate such access, based on the processing of the rule set. For example, the data control rule processing component may instruct the data solution to provide the data and/or instruct the data consumer to proceed with interactions with the data solution to obtain the data. Alternatively or additionally, the data control rule processing component may acquire the requested data itself and forward the data to the data consumer. In some examples, the data control rule processing component may determine that the data cannot be provided (e.g., the desired environment state is not achievable) and may inform the data consumer and/or the data solution accordingly. For example, a condition may be that a password provided by the data consumer has been verified, and the corresponding action is to obtain and verify that password. However, in performing this action, the data control rule processing component may fail to verify the password and therefore the desired state cannot be achieved.

FIG. 6 illustrates an exemplary process 600 for evaluating a rule set that may be implemented at data control system such as those described herein. At 602, a data control rule processing component (e.g., data control rule processing component 104) may retrieve a rule set based on a received or detected request for data access via a data solution. The rule set may include one or more rules in an order, hierarchy, or precedence indicated by rule set data. Each rule of the one or more rules may have one or more conditions and one or more actions. For a particular rule, the one or more associated conditions must be satisfied for the one or more actions to be performed or eligible to be performed. Note that, in examples, a single rule may be described that has one condition and a corresponding one action. However, a rule with multiple actions corresponding to a single condition, a single action corresponding to multiple conditions, and multiple conditions corresponding to multiple actions may be generated and processed as described herein, and all such rules are contemplated as within the scope of the instant disclosure.

At 604, the data control rule processing component may determine a first rule to evaluate based on the hierarchy, order, or precedence associated with the set of rules. The data control rule processing component may evaluate the condition of the first rule. Such conditions may be any data access condition, such as whether particular data has been approved by a user for the proposed processing (e.g., as indicated in a data access request by a data consumer), whether the requesting data consumer is approved to access the requested data, whether sufficient security measures are in place (e.g., secure communications connection between data consumer and data solution), etc. Such conditions may be binary (e.g., queries that may have a "yes" or "no" answer ("user has not approved personal data type of processing")) and/or quantitative (e.g., conditions with numerical responses that may be compared to a threshold (e.g., "user is less than 18 years old")).

At 606, the data control rule processing component may determine if the condition of the first rule is satisfied. If the condition is satisfied, the corresponding action may be added to an action log or list of actions to be performed at 608. Alternatively, the action may be performed immediately by the data control rule processing component.

If the condition has not been satisfied as determined at 606, the process 600 may proceed to 610 to determine if there are further rules to evaluate without adding the action to the action log or list. For example, the condition may be associated with an action to place the environment in a particular state. However, based on the evaluation of the condition, the data control rule processing component may determine that the environment is already in the state associated with the condition. Thus, the action corresponding to the condition is not needed. Alternatively, the evaluation of the condition may determine whether the action is possible. If the action is not possible based on the outcome of the condition determination, then the action may not be placed on the action log or list.

At 610, the data control rule processing component may determine if there are any remaining rules in the rule set (e.g., whether there is a nest highest priority rule in the rule set). If there is, at 612, the data control rule processing component may evaluate the condition of the subsequent rule. At 614, the data control rule processing component may determine if the condition of the subsequent rule is satisfied. If the condition of the subsequent rule is satisfied, the process 600 may return to 608 and the corresponding action in the subsequent rule may be added to an action log or list of actions to be performed at 608. Here again, in some alternatives, the action may be performed immediately by the data control rule processing component.

If the condition has not been satisfied as determined at 614, the process 600 may return to 610 to determine if there are further rules to evaluate without adding the action to the action log or list.

If, at 610, the data control rule processing component determines that there are no additional rules to evaluate after the most recently evaluated rule has been evaluated, the process may proceed to 616 where the data control rule processing component may determine whether there are duplicate and/or conflicting actions in the action log or list. The data control rule processing component may remove duplicate actions from the list. If there are conflicting actions, the data control rule processing component, the data control rule processing component may resolve the conflict as described herein, for example, based on action or associated rule priority, precedence, order, etc. Further at 616, the data control rule processing component may order or reorder the list of actions based on priority, precedence, order, etc. so that actions are performed in a desired or proper order. For example, a second action may depend on a first action (e.g., the second action may process data that is retrieved by the first action). In such situations, the data control rule processing component may ensure that the actions are in correct dependency order. At 618, the resulting list of actions may be performed (e.g., in the applicable order).

Figure 7:
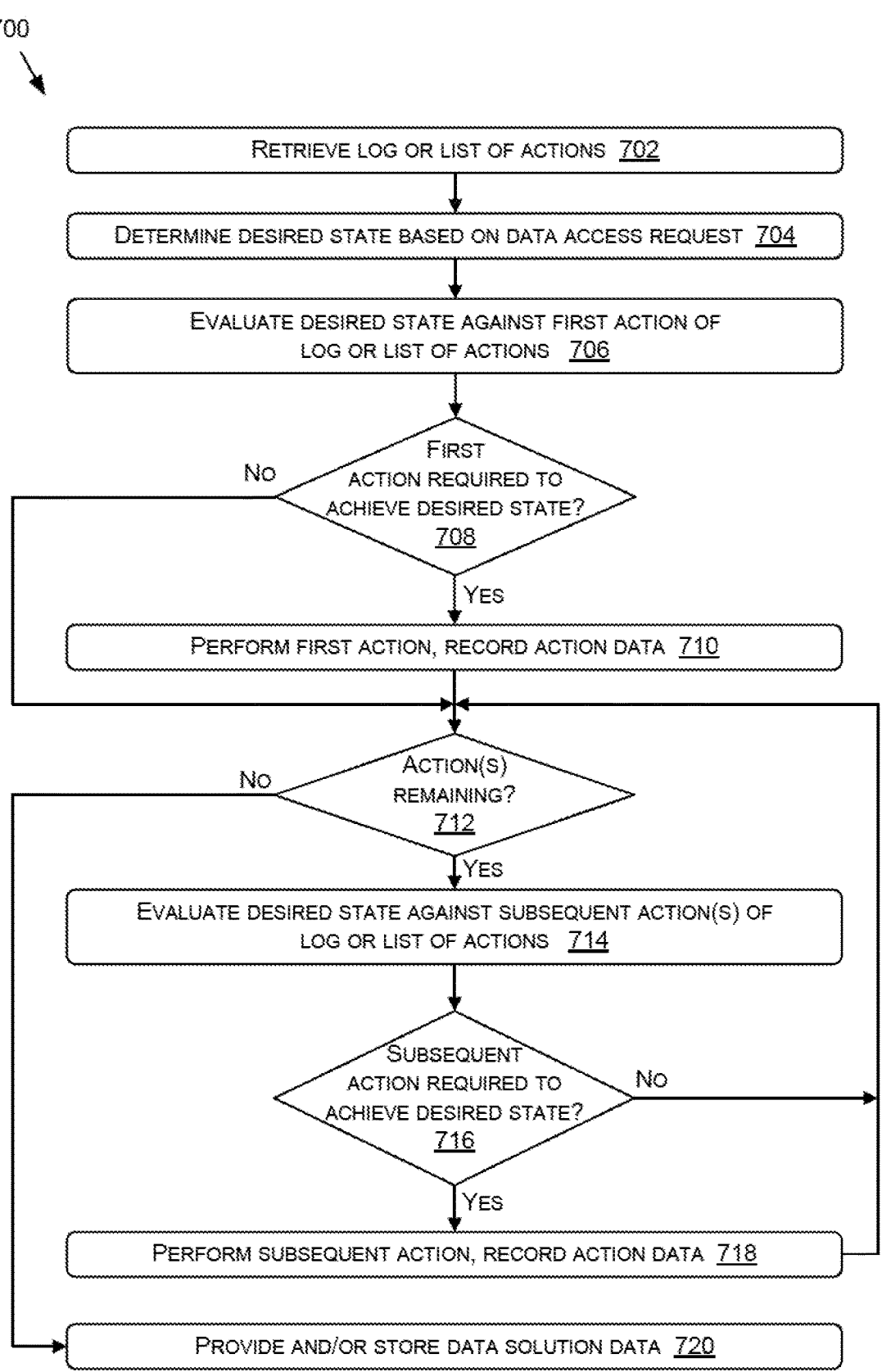
FIG. 7 is a flow diagram illustrating an example process for hierarchically performing actions associated with a data access rule set in a data control system, in accordance with examples of the disclosure.

FIG. 7 illustrates an exemplary process 700 for executing actions determined for a rule set that may be implemented at data control system such as those described herein. At 702, an action log or list, as described herein, may be retrieved or otherwise obtained by a data control rule processing component (e.g., data control rule processing component 104). The action log or list may have been generated or determined the action log or list).

At 704, the data control rule processing component may determine a desired state of the environment and/or data solution. This determination may be made based on the request for data access via a particular data solution received at the data control rule processing component. For example, a desired state may be monitoring and tracking of data exchanged via a secure communications connection between a data solution and a data consumer has been enabled. Other environment states may be desired states and may include any number and combination of configurations, actions, and/or individual component states.

At 706, the first action of the action log or list may be evaluated based on the order, hierarchy, or precedence of the action log or list. The data control rule processing component may determine if the action is required to advance the environment to the desired state. To continue the example above, if the desired state is enabled monitoring and tracking of data exchanged via a secure communications connection between a data solution and a data consumer and the first action is to establish a secure communications connection between the data solution and the data consumer, the first action need not be performed if such a secure communications connection between the data solution and the data consumer is currently active. By checking whether the action is needed to progress to the desired state, the disclosed systems and methods avoid performing unnecessary actions and therefore prevent the wasting of resources.

At 708, if the first action is required to achieve the desired state, at 710, the data control rule processing component executes the action and/or causes the action to be executed or performed. For example, the data control rule processing component may transmit instructions to one or more other components to implement the action (e.g., establish the secure communications connection between the data consumer and the data solution). The data control rule processing component may also, at 710, record any action data or other data associated with performing the action (e.g., time, duration, status, result, affected component(s), etc.). Following execution or initiation of the action, the process 700 may move from 710 to 712 to determine if there are remaining actions to be performed.

If the first action is not required to achieve the desired state, the process 700 may move from 708 to 712 to determine if there are remaining actions to be performed.

At 712, if there are actions remaining in the action log or list, at 714, the data control rule processing component may evaluate the next subsequent action to determine if it is required to advance the environment to the desired state. If the data control rule processing component determines, at 716, that the subsequent action is required to achieve the desired state, at 718, the data control rule processing component executes the subsequent action and/or causes the subsequent action to be executed or performed. The data control rule processing component may also, at 718, record any action data or other data associated with performing the action (e.g., time, duration, status, result, affected component(s), etc.). Here again, the data control rule processing component may transmit instructions to one or more other components to implement the action (e.g., establish the secure communications connection between the data consumer and the data solution). Following execution or initiation of the subsequent action, the process 700 may move from 718 to 712 to determine if there are remaining actions to be performed.

If the subsequent action is not required to achieve the desired state, the process 700 may move from 716 to 712 to determine if there are remaining actions to be performed.

If there are remaining actions determined at 712, the operations of 714, 716, and, if applicable, 718 may be performed until there are no remaining actions in the action log or list determined at 712.

Once all actions have been evaluated and, where applicable, performed or executed, the process 700 may move to 720 where one or more actions may be performed to implement the request data access via the data solution or otherwise resolve the data access request. For example, the data control rule processing component may inform the data consumer and/or the data solution to proceed with the data access. Alternatively or additionally, the data control rule processing component may facilitate the data access and transmit the requested data to the data consumer on behalf of the data solution. Alternatively or additionally, the data control rule processing component may inform the data solution and/or the data consumer that the data access was unsuccessful or has been denied. The data control rule processing component may take any other actions to facilitate the data access and/or resolve the request for data access.

FIG. 8 shows an example system architecture 800 for a computing device 802 that may be used, at least partially, to implement one or more of the data control systems, data consumer systems, data producer systems, and/or data solution systems described herein. The computing device 802 can be a server, computer, or other type of computing device that executes one or more portions of a data control system, such as a data control rule generation component, a data control rule processing, a data control rules data store, a data processing logs data store, and/or any other components or portions of a data control system. The computing device 802 can also be a server, computer, or other type of computing device that executes one or more portions of a data consumer system, a data producer system, and/or a data solution system. In some examples, elements of the disclosed systems can be distributed among, and/or be executed by, multiple computing devices similar to the computing device shown in FIG. 8. For example, data control rule generation component(s) may execute on a different computing device than data control rule processing component(s) and/or the data store component(s).

The computing device 802 can include memory 804. In various examples, the memory 804 can include system memory, which may be volatile (such as RAM), non-volatile (such as ROM, flash memory, etc.) or some combination of the two. The memory 804 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 802 associated with the disclosed systems. Any such non-transitory computer-readable media may be part of the computing device 802.

The memory 804 can store modules and data 806. The modules and data 806 can include, or the memory 804 can otherwise store, one or more data control rule processing components 822, including data representing one or more data control rules 824. The modules and data 806 can also, or instead, include, or the memory 804 can otherwise store, one or more data control rule generation components 826, one or more data processing logging components 828, and/or other elements described herein. Additionally, or alternately, the modules and data 806 can include any other modules and/or data that can be utilized by the disclosed systems to perform or enable performing any action taken by such systems. Such other modules and data can include a platform, operating system, and applications, and data utilized by the platform, operating system, and applications.

The computing device 802 associated with the disclosed systems can also have processor(s) 808, communication interfaces 810, display 812, output devices 814, input devices 816, and/or a drive unit 818 including a machine-readable medium 820.

In various examples, the processor(s) 808 can be a central processing unit (CPU), a graphics processing unit (GPU), both a CPU and a GPU, or any other type of processing unit. Each of the one or more processor(s) 808 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 808 may also be responsible for executing computer applications stored in the memory 804, which can be associated with common types of volatile (RAM) and/or nonvolatile (ROM) memory.

The communication interfaces 810 can include transceivers, modems, interfaces, antennas, telephone connections, and/or other components that can transmit and/or receive data over networks, telephone lines, or other connections.

The display 812 can be a liquid crystal display, or any other type of display commonly used in computing devices. For example, a display 812 may be a touch-sensitive display screen and can then also act as an input device or keypad, such as for providing a soft-key keyboard, navigation buttons, or any other type of input.

The output devices 814 can include any sort of output devices known in the art, such as a display 812, speakers, a vibrating mechanism, and/or a tactile feedback mechanism. Output devices 814 can also include ports for one or more peripheral devices, such as headphones, peripheral speakers, and/or a peripheral display.

The input devices 816 can include any sort of input devices known in the art. For example, input devices 816 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine-readable medium 820 can store one or more sets of instructions, such as software or firmware, which embody any one or more of the methodologies or functions described herein. The instructions can also reside, completely or at least partially, within the memory 804, processor(s) 808, and/or communication interface(s) 810 during execution thereof by the computing device 802 associated with the disclosed systems. The memory 804 and the processor(s) 808 also can constitute machine-readable media 820.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:

receiving, by a processor executing in a computing environment, data solution intercommunication data associated with access to data via a data solution;

determining, by the processor, an ordered set of data access data structures associated with the data solution, individual structures of the ordered set of data access data structures comprising condition data and corresponding computer execution data;

determining, by the processor, based at least in part on the data solution intercommunication data, that a state of the computing environment corresponds to first condition data of a first structure of the ordered set of data access data structures;

determining, by the processor, based at least in part on the data solution intercommunication data, that the state of the computing environment corresponds to second condition data of a second structure of the ordered set of data access data structures;

storing, by the processor in a data file, based at least in part on determining that the state of the computing environment corresponds to first condition data and the second condition data:

first computer execution data corresponding to the first condition data, and second computer execution data corresponding to the second condition data;

modifying, by the processor, based at least in part on the state of the computing environment, the data file by removing the second computer execution data from the data file; and executing, by the processor, based at least in part on the first computer execution data in the data file, one or more computing processes.

2. The method of claim 1, wherein the state of the computing environment indicates that one of:

the first computer execution data is redundant to the second computer execution data, or the first computer execution data is contradictory to the second computer execution data.

3. The method of claim 1, wherein the first computer execution data comprises data, that when executed by a second processor, cause the second processor to perform one or more of:

establish a secure communications session with the data solution;

initiate monitoring of a communications session; or generating a notification to the data solution.

4. The method of claim 1, further comprising:

receiving, by the processor, a request to modify the ordered set of data access data structures, the request comprising a modified first structure of the ordered set of data access data structures;

determining an updated first structure of the ordered set of data access data structures based at least in part on the request; and associating, by the processor, the updated first structure of the ordered set of data access data structures with the ordered set of data access data structures.

5. The method of claim 4, wherein associating the updated first structure of the ordered set of data access data structures with the ordered set of data access data structures comprises:

transmitting a second request for approval of the updated first structure of the ordered set of data access data structures to the data solution; and replacing the first structure of the ordered set of data access data structures with the updated first structure of the ordered set of data access data structures based at least in part on a response to the second request received from the data solution.

6. The method of claim 4, wherein the modified first structure of the ordered set of data access data structures comprises one or more of modified first condition data or modified first computer execution data.

7. The method of claim 1, further comprising:

generating the ordered set of data access data structures; and associating the ordered set of data access data structures with the data solution and at least one additional data solution.

8. The method of claim 1, further comprising generating the ordered set of data access data structures based at least in part on the data solution and at least one data consumer.

9. The method of claim 1, wherein the first structure of the ordered set of data access data structures comprises third computer execution data.

10. A non-transitory computer-readable medium comprising instructions that, when executed by one or more processors executing on a data control system configured in a computing environment, cause the one or more processors to perform operations comprising:

receiving data solution intercommunication data associated with access to data via a data solution;

determining an ordered set of data access data structures associated with the data solution, individual structures of the ordered set of data access data structures comprising condition data and corresponding computer execution data;

determining, based at least in part on the data solution intercommunication data, that a state of the computing environment corresponds to first condition data of a first structure of the ordered set of data access data structures;

determining, based at least in part on the data solution intercommunication data, that the state of the computing environment corresponds to second condition data of a second structure of the ordered set of data access data structures;

storing, in a data file, based at least in part on determining that the state of the computing environment corresponds to first condition data and the second condition data:

first computer execution data corresponding to the first condition data, and second computer execution data corresponding to the second condition data;

modifying, based at least in part on the state of the computing environment, the data file by removing the second computer execution data from the data file; and executing, based at least in part on the first computer execution data in the data file, one or more computing processes.

11. The non-transitory computer-readable medium of claim 10, wherein the first structure of the ordered set of data access data structures comprises third computer execution data.

12. The non-transitory computer-readable medium of claim 10, wherein the state of the computing environment indicates that one of:

the first computer execution data is redundant to the second computer execution data, or the first computer execution data is contradictory to the second computer execution data.

13. The non-transitory computer-readable medium of claim 10, wherein the first computer execution data comprises data, that when executed by a second processor, cause the second processor to perform one or more of:

establish a secure communications session with the data solution;

initiate monitoring of a communications session; or generating a notification to the data solution.

14. The non-transitory computer-readable medium of claim 10, wherein the operations further comprise generating the ordered set of data access data structures based at least in part on the data solution and at least one data consumer.

15. The non-transitory computer-readable medium of claim 10, wherein the operations further comprise:

generating the ordered set of data access data structures; and associating the ordered set of data access data structures with the data solution and at least one additional data solution.

16. A system comprising:

one or more processors executing in a computing environment; and a non-transitory memory storing computer-executable instructions that, when executed, cause the one or more processors to perform operations comprising:

receiving data solution intercommunication data associated with access to data via a data solution;

determining an ordered set of data access data structures associated with the data solution, individual structures of the ordered set of data access data structures comprising condition data and corresponding computer execution data;

determining, based at least in part on the data solution intercommunication data, that a state of the computing environment corresponds to first condition data of a first structure of the ordered set of data access data structures;

determining, based at least in part on the data solution intercommunication data, that the state of the computing environment corresponds to second condition data of a second structure of the ordered set of data access data structures;

storing, in a data file, based at least in part on determining that the state of the computing environment corresponds to first condition data and the second condition data:

first computer execution data corresponding to the first condition data, and second computer execution data corresponding to the second condition data;

modifying, based at least in part on the state of the computing environment, the data file by removing the second computer execution data from the data file; and executing, based at least in part on the first computer execution data in the data file, one or more computing processes.

17. The system of claim 16, wherein the first structure of the ordered set of data access data structures comprises third computer execution data.

18. The system of claim 16, wherein the operations further comprise:

receiving a request to modify the ordered set of data access data structures, the request comprising a modified first structure of the ordered set of data access data structures;

determining an updated first structure of the ordered set of data access data structures based at least in part on the request; and associating the updated first structure of the ordered set of data access data structures with the ordered set of data access data structures.

19. The system of claim 18, wherein the modified first structure of the ordered set of data access data structures comprises one or more of modified first condition data or modified first computer execution data.

20. The system of claim 16, wherein the state of the computing environment indicates that one of:

the first computer execution data is redundant to the second computer execution data, or the first computer execution data is contradictory to the second computer execution data.

\* \* \* \* \*